(12) United States Patent
Komura et al.

(10) Patent No.: US 7,769,209 B2
(45) Date of Patent: Aug. 3, 2010

(54) BIOMETRIC AUTHENTICATION METHOD AND BIOMETRIC AUTHENTICATION APPARATUS

(75) Inventors: Kazuhiro Komura, Inagi (JP); Kiyoshi Arai, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 970 days.

(21) Appl. No.: 11/542,570

(22) Filed: Oct. 4, 2006

(65) Prior Publication Data

US 2007/0217660 A1   Sep. 20, 2007

(30) Foreign Application Priority Data

Mar. 14, 2006   (JP) .............................. 2006-068902

(51) Int. Cl.
*G06K 9/00*   (2006.01)
(52) U.S. Cl. ..................... 382/115; 340/5.53; 340/5.83; 382/100; 382/190; 705/44; 705/67; 713/172; 713/186
(58) Field of Classification Search ................. 382/115, 382/190; 704/246, 270, 270.1; 705/1, 39, 705/44; 713/186
See application file for complete search history.

(56) References Cited

U.S. PATENT DOCUMENTS

| | | | |
|---|---|---|---|
| 6,185,316 B1* | 2/2001 | Buffam ...................... | 382/115 |
| 6,301,375 B1* | 10/2001 | Choi ........................... | 382/115 |
| 6,914,517 B2* | 7/2005 | Kinsella ..................... | 340/5.83 |
| 6,950,539 B2* | 9/2005 | Bjorn et al. ................. | 382/124 |
| 6,983,061 B2* | 1/2006 | Ikegami et al. .............. | 382/115 |
| 7,020,308 B1* | 3/2006 | Shinzaki et al. ............. | 382/124 |
| 7,116,805 B2* | 10/2006 | Machida ..................... | 382/124 |
| 7,165,716 B1* | 1/2007 | Modl et al. .................. | 235/379 |
| 7,289,959 B2* | 10/2007 | Praca ......................... | 704/270.1 |
| 7,333,638 B2* | 2/2008 | Chisamore et al. .......... | 382/124 |

(Continued)

FOREIGN PATENT DOCUMENTS

JP   11-253427 A   9/1999

(Continued)

OTHER PUBLICATIONS

Sun et al. "Cascading Statistical and Structural Classifiers for Iris Recognition", Image Processing, 2004, pp. 1261-1264.

(Continued)

*Primary Examiner*—Gregory M Desire
(74) *Attorney, Agent, or Firm*—Westerman, Hattori, Daniels & Adrian, LLP

(57) ABSTRACT

A biometric authentication device, which uses biometrics characteristic information to perform individual authentication, prevents declines in verification speed even when numerous biometrics information sets have been registered. A control unit registers broad characteristic quantities for blood vessel image data from an image capture device, together with characteristic data for verification. And at the time of authentication the control unit uses degrees of similarity of characteristic quantities to determine an order of verification, and performs verification of blood vessel image characteristic data in the verification order thus determined. The order of verification is determined based on captured blood vessel images, so that even when numerous characteristic data sets have been registered, verification can be performed in an order of verification based on a blood vessel image of the user, and the speed of verification can be improved.

26 Claims, 15 Drawing Sheets

U.S. PATENT DOCUMENTS

| | | | |
|---|---|---|---|
| 7,349,559 B2* | 3/2008 | Miyasaka | 382/124 |
| 7,512,567 B2* | 3/2009 | Bemmel et al. | 705/67 |
| 7,574,734 B2* | 8/2009 | Fedronic et al. | 726/9 |
| 7,613,929 B2* | 11/2009 | Cohen et al. | 713/186 |
| 2001/0032096 A1* | 10/2001 | Uchida | 705/1 |
| 2003/0140232 A1* | 7/2003 | De Lanauze | 713/186 |
| 2003/0174891 A1 | 9/2003 | Wenzel et al. | |
| 2004/0022421 A1 | 2/2004 | Endoh et al. | |
| 2004/0133582 A1 | 7/2004 | Howard et al. | |
| 2006/0143117 A1* | 6/2006 | Chigira et al. | 705/39 |
| 2007/0217660 A1* | 9/2007 | Komura et al. | 382/115 |

FOREIGN PATENT DOCUMENTS

| | | |
|---|---|---|
| JP | 2000-293643 A | 10/2000 |
| JP | 2004-62826 A | 2/2004 |

OTHER PUBLICATIONS

Viola et al. "Rapid Object Detection Using a Boosted Cascade of Simple Features" IEEE Conference held Dec. 8, 2001, vol. 1 of 2.

Cross et al. "Thermographic Imaging of the Subcutaneous Vascular Network of the Back of the Hand for Biometric Identification", Security Technology 1995, Oct. 18, 1995, pp. 20-35.

European Search Report dated Jan. 12, 2007, issued in corresponding European Application No. 06255148.

* cited by examiner

BLOOD VESSEL IMAGE N1

|   | 0 | 1 | 2 | 3 | 4 |
|---|---|---|---|---|---|
| 0 | 255 | 255 | 0 | 255 | 255 |
| 1 | 255 | 255 | 0 | 0 | 0 |
| 2 | 255 | 255 | 0 | 255 | 0 |
| 3 | 0 | 0 | 255 | 0 | 0 |
| 4 | 0 | 0 | 0 | 255 | 0 |

BLOOD VESSEL IMAGE N2

|   | 0 | 1 | 2 | 3 | 4 |
|---|---|---|---|---|---|
| 0 | 255 | 255 | 0 | 0 | 255 |
| 1 | 255 | 255 | 255 | 0 | 0 |
| 2 | 255 | 255 | 0 | 255 | 255 |
| 3 | 0 | 0 | 255 | 255 | 0 |
| 4 | 0 | 0 | 0 | 255 | 255 |

FIG. 18

COMPUTATION OF SCORES OF VEIN CHARACTERISTIC QUANTITIES
COMPUTE FOLLOWING SCORES FOR ALL REGISTERED DATA
(ALL RECORDS)

■ SCORE (1): SUM OF DIFFERENCES FOR EACH OF CURVATURE
COMPONENTS IN 36 DIRECTIONS
score 1 = |REGISTERED w1 - VERIFICATION w1| + ...
+ |REGISTERED w36 - VERIFICATION w36|

■ SCORE (2): SUM OF DIFFERENCES FOR EACH OF ANGLE
COMPONENTS IN 8 DIRECTIONS
score 2 = |REGISTERED f1 - VERIFICATION f1| + ...
+ |REGISTERED f8 - VERIFICATION f8|

■ SCORE (3): SUM OF DIFFERENCES OF EACH OF 32 FREQUENCIES
score 3 = |REGISTERED h1 - VERIFICATION h1| + ...
+ |REGISTERED h32 - VERIFICATION h32|

FIG. 19

■ SCORE SORTING
SORT SCORES score1[N], score2[N], score3[N]   — S70

■ COMPUTE TOTAL SCORE
total[N] = $\alpha$·score1 RANKING + $\beta$·score2 RANKING + $\gamma$·score3 RANKING
$\alpha, \beta, \gamma$ ARE WEIGHTING COEFFICIENTS   — S72

■ SORT TOTAL SCORES
SORT THE RESULTS FOR total[N] FOR USE AS VERIFICATION ORDER   — S74

BIOMETRIC AUTHENTICATION METHOD AND BIOMETRIC AUTHENTICATION APPARATUS

CROSS-REFERENCE TO RELATED APPLICATIONS

This application is based upon and claims the benefit of priority from the prior Japanese Patent Application No. 2006-068902, filed on Mar. 14, 2006, the entire contents of which are incorporated herein by reference.

BACKGROUND OF THE INVENTION

1. Field of the Invention

This invention relates to a biometric authentication method and a biometric authentication apparatus, which utilize biometrics characteristics which are a portion of a human body, to authorize individuals, and in particular relates to a biometric authentication method and a biometric authentication apparatus which are suitable for improving the speed of verification of numerous registered biometrics characteristic information sets against detected biometrics characteristic information.

2. Description of the Related Art

There are numerous portions of the human body which can be used to differentiate the individual, such as fingerprints and toeprints, the retinas of the eyes, facial features, and blood vessels. With advances in biometrics technology in recent years, various devices have been provided which identify biometrics features of a portion of the human body to authenticate individuals.

For example, comparatively large amounts of individual characteristic data are obtained from blood vessels in the fingers and palms of the hands, and from palmprints. Blood vessel (vein) patterns remain unchanged throughout life from infancy and are regarded as being completely unique, and so are well-suited to individual authentication.

In order to utilize this biometrics information to perform individual authentication, at the time of registration or of authentication the user brings his palm into proximity with an image capture device. The image capture device emits near-infrared rays, which are incident on the palm of the hand. The image capture device uses a sensor to capture near-infrared rays reflected from the palm of the hand. Hemoglobin in the red corpuscles flowing in the veins has lost oxygen. This hemoglobin (reduced hemoglobin) absorbs near-infrared rays at wavelengths near 760 nanometers. Consequently when near-infrared rays are made incident on the palm of a hand, reflection is reduced only in the areas in which there are veins, and the intensity of the reflected near-infrared rays can be used to identify the positions of veins (blood vessel images).

The user first uses an image capture device to register vein image data of the palm of his own hand in a server or on a card. Then, in order to perform individual authentication, the user employs an image capture device to cause the vein image data of his own hand to be read. The registered vein image is verified against the vein pattern of the vein image for verification thus read, and individual authentication is performed (see for example Japanese Patent Laid-open No. 2004-062826 (FIG. 2 through FIG. 9)).

In such a biometric authentication system for example in the field of fingerprint authentication, a method has been disclosed in which characteristic data A at a comparatively low level (at which outside leakage is tolerated), and characteristic data B at a comparatively high level which is to be kept confidential, are stored in an IC card. The characteristic data A is transmitted from the IC card to an external device comprising a fingerprint sensor, and the external device performs verification of the characteristic data A (called primary verification), and transmits the verification result and characteristic data B' extracted from the image from the fingerprint sensor to the IC card; within the IC card, verification with the characteristic data B is performed (called secondary verification) (see for example Japanese Patent Laid-open No. 2000-293643 (FIG. 5 and FIG. 6)).

However, with progress in biometric authentication technology in recent years, a large amount of biometrics characteristic data has been registered. For example, a large number of biometrics characteristic data sets are registered on servers for use by security systems which manage ingress and egress in apartment buildings, office buildings and other facilities.

In such a mode of use, numerous verifications of captured biometrics information against registered biometrics information must be performed, so that time is required for verification. Particularly when precision is required in biometrics verification, the large quantity of biometrics characteristic data and the complexity of the verification algorithms used means that even more time is required for verification. As a result the wait time for users is lengthened, which in turn impedes adoption of the technology.

Methods are conceivable in which users are assigned IDs, the IDs are registered together with biometrics characteristic data, and the user also inputs his ID; however, the assigning of separate IDs to each user is troublesome, and may result in inconvenience to the user. For example, in the case of application to ingress and egress to and from a facility, it is more convenient to a user who enters and leaves the facility to be able to use an ID assigned to the facility to perform biometric authentication. In this case also, verification of captured biometrics information against biometrics information registered for the ID must be executed numerous times, so that time is required for verification.

And, in biometric authentication based on the above-described primary verification and secondary verification, the characteristic data A at the comparatively low level (at which outside leakage is tolerated) is specific to that user, and when applied to this mode of use also, the effect in shortening verification time is minimal.

SUMMARY OF THE INVENTION

Hence one object of the invention is to provide a biometric authentication method and biometric authentication apparatus to shorten the time for verification, even when numerous biometrics information sets have been registered.

A further object of the invention is to provide a biometric authentication method and biometric authentication apparatus to shorten the time for verification, and facilitate widespread adoption of biometric authentication using biometrics information for numerous different users.

Still a further object of the invention is to provide a biometric authentication method and biometric authentication apparatus to enable limitation of the range of registered biometrics information based on detected biometrics information, even when numerous biometrics information sets have been registered.

In order to attain these objects, a biometric authentication apparatus of this invention, which detects biometrics characteristic data and performs individual authentication, has a detection device, which detects a living body and obtains biometrics information; a control unit, which extracts, from the biometrics information, comparatively coarse first biometrics characteristic data and comparatively fine second characteristic data on the user; and a biometrics information database file, in which is stored, as biometrics information on the user, the first biometrics characteristic data and second biometrics characteristic data. The control unit extracts comparatively coarse first biometrics characteristic data and comparatively fine second characteristic data for use in verification from the biometrics information obtained by the detection device, calculates the degree of similarity between the first biometrics characteristic data for verification and first biometrics characteristic data sets stored in the biometrics database file, determines the order of verification with the second biometrics characteristic data sets stored in the biometrics database file according to the degrees of similarity, and performs verification of the second biometrics characteristic data for verification with the stored second biometrics characteristic data sets according to this verification order.

Further, a biometric authentication method of this invention, in which biometrics characteristic data is detected and individual authentication is performed, has a step of detecting a living body using a detection device; a step of extracting, from biometrics information of the detected living body, comparatively coarse first biometrics characteristic data and comparatively fine second characteristic data on the user; a step of calculating the degrees of similarity between the first biometrics characteristic data for verification and the first biometrics characteristic data sets stored in a biometrics database file, and for determining the order of verification with the second biometrics characteristic data sets stored in the biometrics database file according to the degrees of similarity; and a step of verifying the second biometrics characteristic data for verification against the stored second biometrics characteristic data sets according to this verification order.

Further, in this invention it is preferable that the control unit calculate scores for the first biometrics characteristic data for verification and first biometrics characteristic data sets stored in the biometrics database file, to obtain the degrees of similarity.

Further, in this invention it is preferable that the control unit extract, as the first biometrics characteristic data, direction components of patterns of the biometrics information.

Further, in this invention it is preferable that the control unit extract, as the first biometrics characteristic data, direction components and periodicity components of patterns of the biometrics information.

Further, in this invention it is preferable that the control unit extract, as the direction components of the patterns, curvature components of the patterns.

Further, in this invention it is preferable that the control unit extract, as the direction components of the patterns, angular components of the patterns.

Further, in this invention it is preferable that the control unit extract, as the periodicity components of the patterns, frequency components of the patterns.

Further, in this invention it is preferable that the control unit extracts a plurality of component segments of said patterns, vectorizes the component segments, and extracts the curvature direction components from said vectorized segments.

Further, in this invention it is preferable that the control unit generates a histogram of curvature directions from curvature components of each segment.

Further, in this invention it is preferable that the control unit calculate the spatial frequency components of the biometrics information, and extract, as the angular components, Fourier angular characteristic amounts from the spatial frequency components.

Further, in this invention it is preferable that the control unit calculate the spatial frequency components of the biometrics information, and extract, as the frequency components, Fourier texture characteristic amounts from the spatial frequency components.

Further, in this invention it is preferable that the control unit calculate a score for the first biometrics characteristic data for verification and first biometrics characteristic data sets stored in the database file, sort the distances between each of the stored data sets, and determine the verification order.

Further, in this invention it is preferable that the detection device comprise a unit which captures images of blood vessels for the user, that the first biometrics characteristic data is comparatively coarse characteristic data of a blood vessel image, and that the second biometrics characteristic data is comparatively fine characteristic data of a blood vessel image.

In this invention, broad characteristic quantities of biometrics data are registered together with characteristic data for verification, and at the time of authentication the degree of similarity of characteristic quantities is used to determine the verification order; the verification order determined in this way is used to perform verification of characteristic data. Hence because the verification order is determined based on biometrics information, verification can be performed using the verification order determined from the biometrics information for the user even when numerous characteristic data sets are registered, so that the speed of verification can be improved.

BRIEF DESCRIPTION OF THE DRAWINGS

FIG. 18 explains an example of the score calculation in FIG. 17;

FIG. 19 shows the flow of processing to determine the verification order in FIG. 17; and, FIG. 20 explains processing to determine the verification order in FIG. 17 and FIG. 19.

DESCRIPTION OF THE PREFERRED EMBODIMENTS

Below, embodiments of the invention are explained in the order of a biometric authentication system, biometrics information registration processing, biometrics information authentication processing, and other embodiments.

Biometric Authentication System

Figure 1:
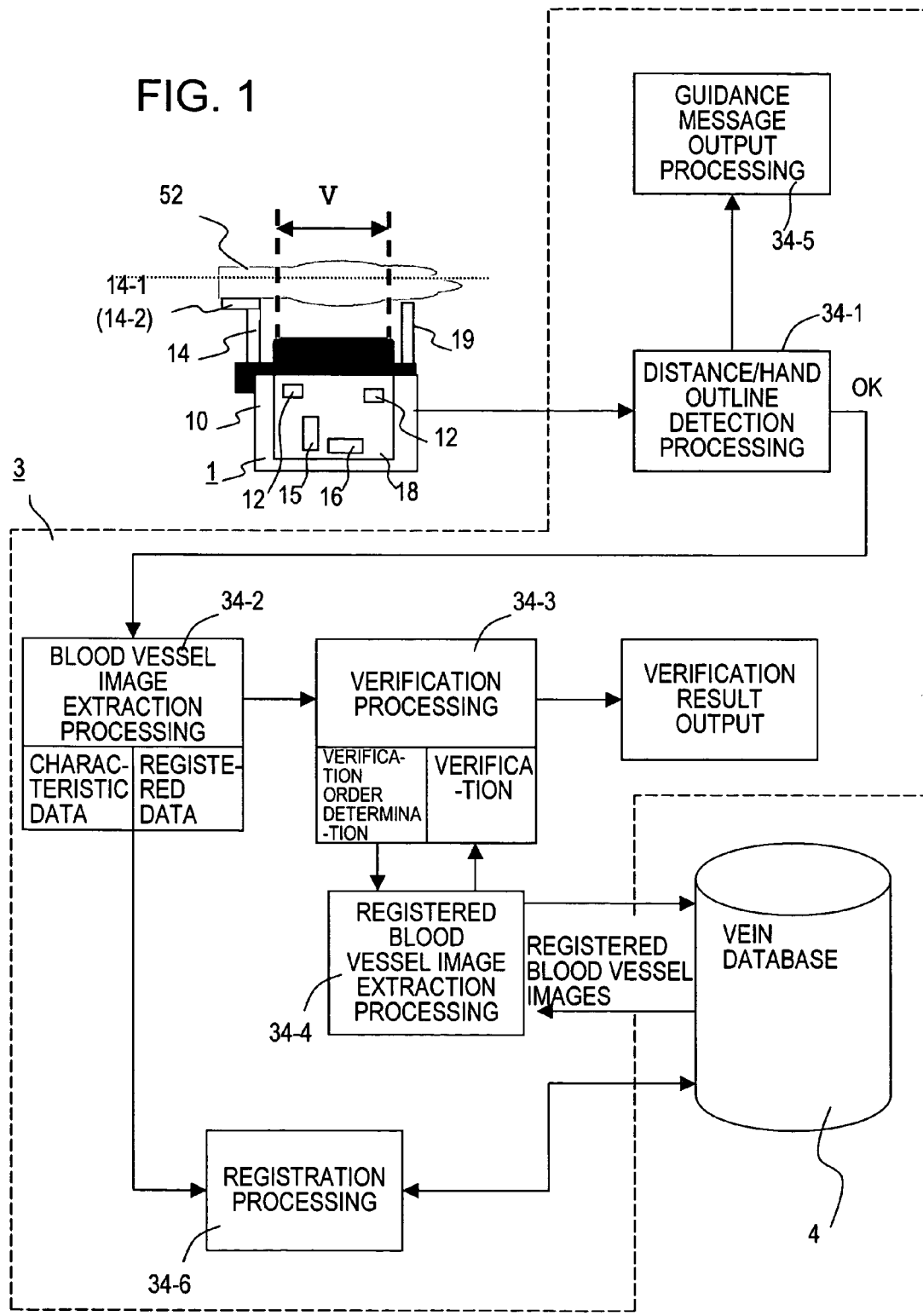
FIG. 1 shows the configuration of the biometric authentication system of one embodiment of the invention.
Figure 2:
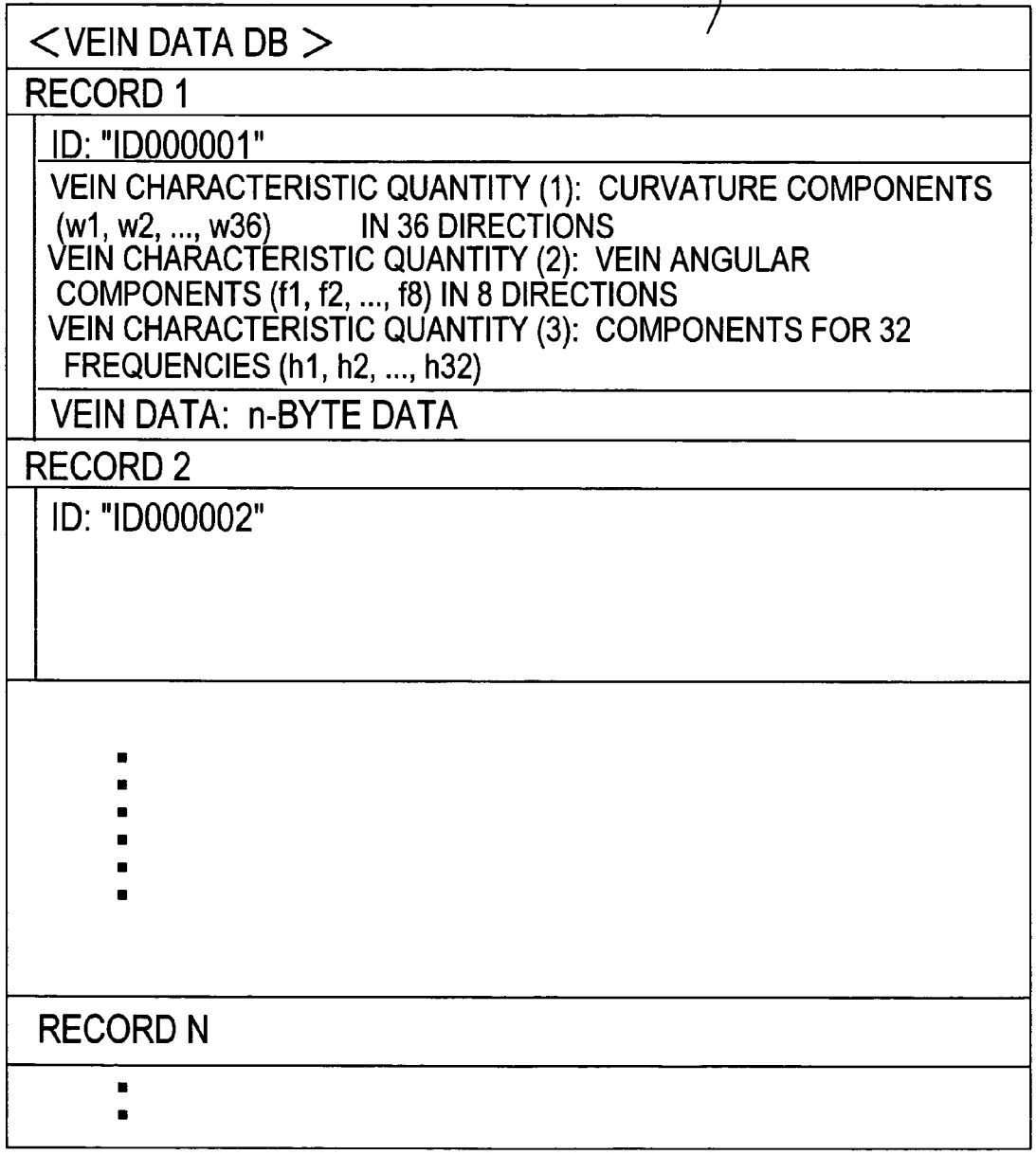
FIG. 2 shows the configuration of the biometrics database file of FIG. 1.
Figures 3, 4:
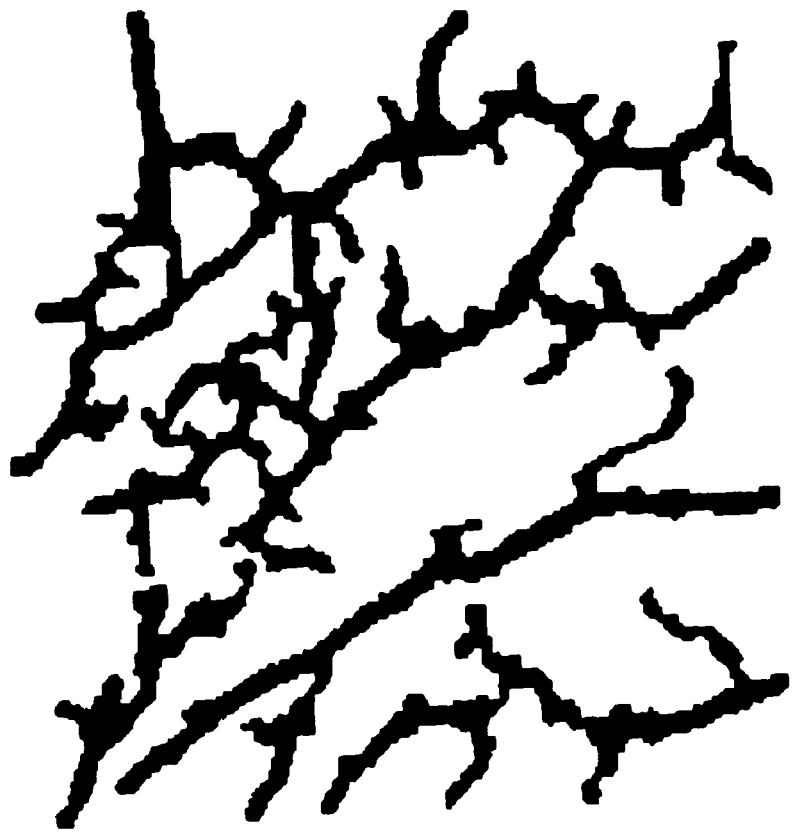
FIG. 3 explains captured images in FIG. 1.
FIG. 4 explains biometrics information in FIG. 1.
Figure 5:
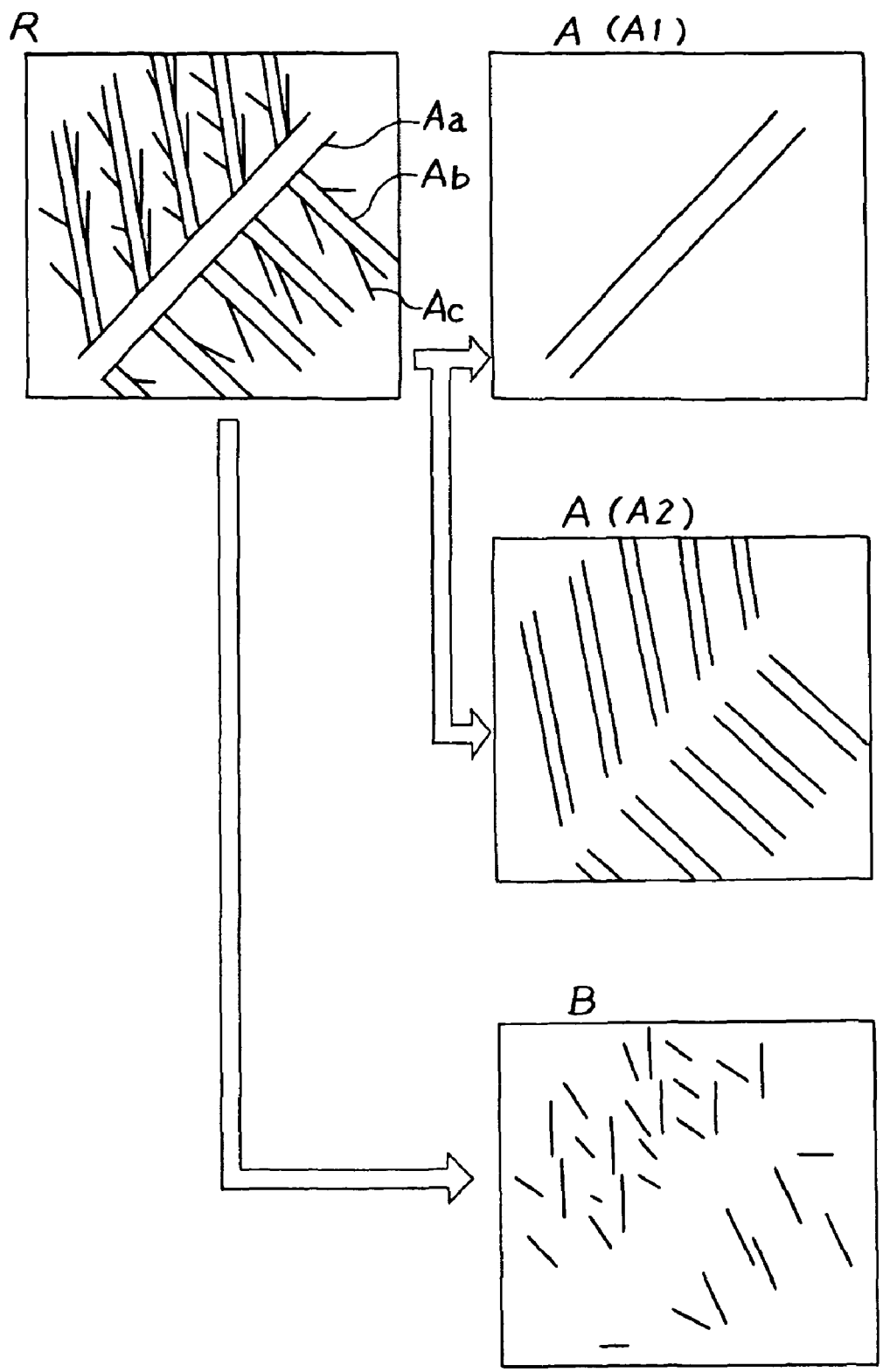
FIG. 5 explains the second biometrics characteristic data in FIG. 1.
Figure 6:
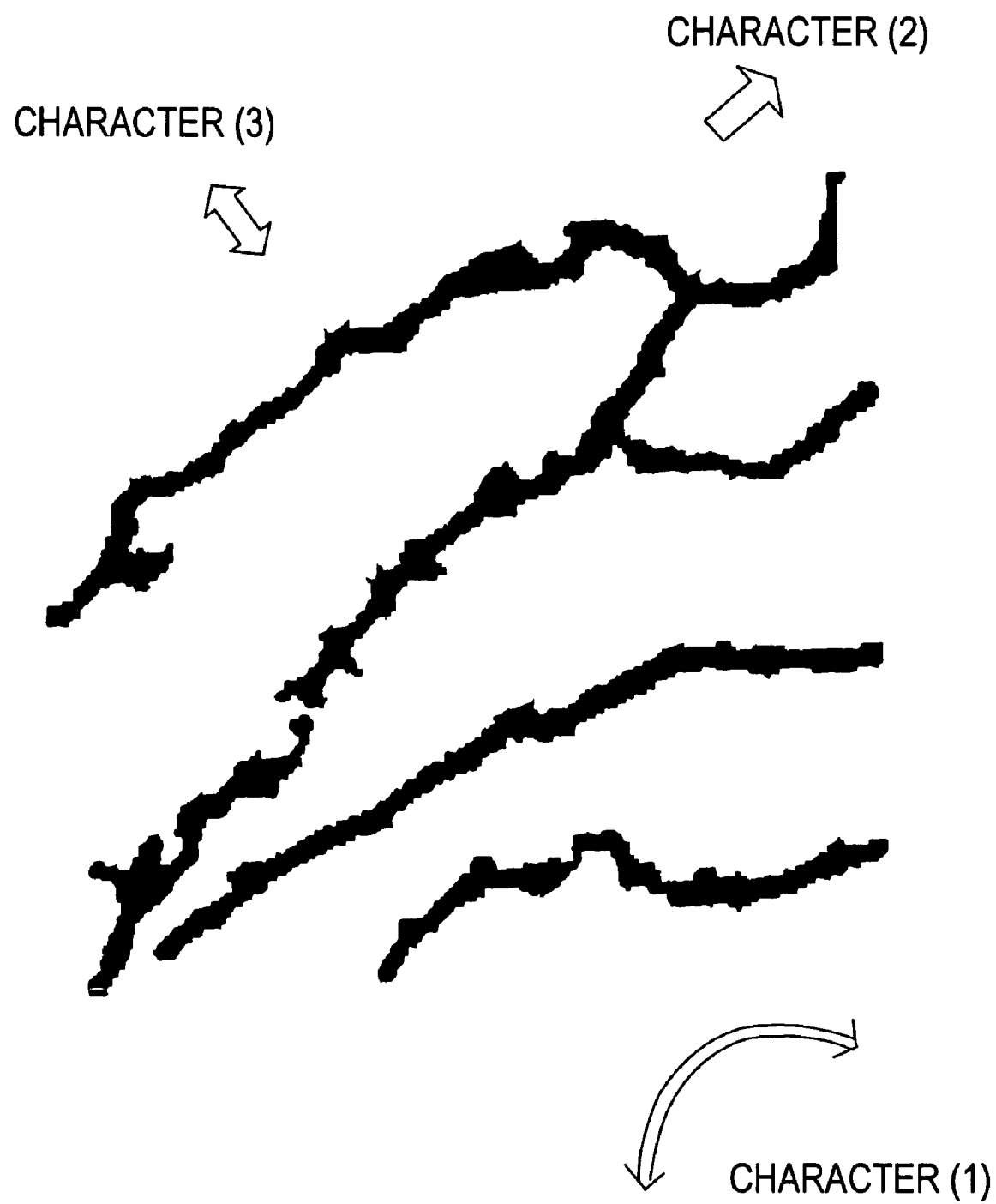
FIG. 6 explains the first biometrics characteristic data in FIG. 1.

FIG. 1 shows the configuration of the biometric authentication system of one embodiment of the invention, FIG. 2 shows the configuration of the biometrics database file of FIG. 1, FIG. 3 explains detected blood vessel images in FIG. 1, FIG. 4 explains blood vessel image data in FIG. 1, FIG. 5 explains the second biometrics characteristic data in FIG. 2, and FIG. 6 explains the biometrics characteristic data in FIG. 1.

FIG. 1 shows a palm vein authentication system in a facility, as an example of a biometric authentication system. The biometric authentication system has a palm image capture device 1, a processing device 3 connected thereto, and a biometrics database file 4.

The operation of this system is explained. A user requesting vein authentication extends his hand over the palm image capture device (hereafter "image capture device") 1. The image capture device 1 reads the palm image, and through blood vessel image extraction processing in the processing device 3, the vein pattern is extracted, and is registered (stored) as vein data in the biometrics database file 4.

In order to enter the facility, the user holds his hand over the image capture device 1 to perform vein authentication. The image capture device 1 reads the palm of the hand, and the vein pattern of the palm is extracted through blood vessel extraction processing by the processing device 3. The processing device 3 performs verification processing to verify the vein pattern, as vein data, against vein data registered in the biometrics database file 4, to authenticate the user.

As shown in FIG. 1, the palm image capture device 1 has a sensor unit 18 mounted substantially in the center of the main unit 10. On the forward portion (on the user side) of the sensor unit 18 is provided a front guide 14; on the rear side is provided a rear guide 19. The front guide 14 is comprised of a sheet of synthetic resin, transparent or substantially transparent.

The front guide 14 guides the hand in front and supports the wrist. Hence the front guide 14 guides the user and supports the hand so as to guide the wrist above the sensor unit 18. As a result, the attitude of the palm of the hand, that is, the position, inclination, and size over the sensor unit 18 can be controlled. The cross-sectional shape of the front guide 14 has a vertical body and, in the top portion, a horizontal portion 14-1 to support the wrist. A depression 14-2 is formed continuously in the center of the horizontal portion 14-1, to facilitate positioning of the wrist. The rear guide 19 serves to support the fingers.

The sensor unit 18 is provided with an infrared sensor (CMOS sensor) and focusing lens 16 and a distance sensor 15 in the center; on the periphery thereof are provided a plurality of near-infrared light emission elements (LEDs) 12. For example, near-infrared light emission elements 12 are provided at eight places on the periphery, to emit near-infrared rays upwards.

The readable region V of this sensor unit 18 is regulated by the relation between the sensor, focusing lens, and near-infrared light emission region. Hence the position and height of the front guide 14 are set such that the supported palm is positioned in the readable region V.

When the hand 52 is extended with palm flat, the palm has maximum area, and moreover is flat, so that when the palm is subjected to image capture in the image capture region V of the sensor unit 18, an accurate vein pattern which can be used in registration and verification is obtained. When the distance from the sensor unit 18 to the palm is within a prescribed range, a sharp, focused image is obtained by the sensor 16 of the sensor unit 18.

Hence as shown in FIG. 1, by having the front guide 14 support the wrist 52 above the sensor unit 18, the user's hand can be guided and supported such that the position, inclination and height of the palm above the sensor unit 18 are made precise with respect to the image capture range of the sensor unit 18.

The processing device 3 connected to the image capture device 1 executes the series of registration and verification processing 34-1 through 34-6, as shown in FIG. 1. Distance/hand outline detection processing 34-1 receives the distance measured by the distance sensor 15 of the image capture devices 1, judges whether the palm of the hand or other object is at a distance in a prescribed range from the sensor unit 18 and also detects the outline of the hand from the image captured by the sensor unit 18, and judges from the outline whether the image can be used in registration and verification processing. For example, the palm may not appear sufficiently in the image.

Guidance message output processing 34-5 outputs to a display, not shown, a message to guide the palm to the left or right, forward or backward, upward or downward, when the distance measured by the distance sensor 15 or the position of the hand according to hand outline extraction indicates that the hand is outside the image capture range, or when the image cannot be used in registration and verification processing. By this means, the palm of the hand of the user is guided over the image capture device 1.

Blood vessel image extraction processing 34-2 extracts a vein image from the image of the hand when the hand outline detection processing 34-1 judges that an image has been captured with the hand held correctly. That is, an image of the palm such as that of FIG. 3 is obtained through differences in reflectivity. The vein image is an image like that shown in FIG. 3; the data is grayscale data such as that in FIG. 4. The blood vessel image extraction processing 34-2 further generates, from the plain data (blood vessel image data) of FIG. 3 and FIG. 4, blood vessel image characteristic (verification) data (a second characteristic data) explained in FIG. 5, and characteristic quantity data (a first characteristic data) explained in FIG. 6.

As can be understood from FIG. 3, a blood vessel image R can be classified into trunks Aa, wide branches Ab, and fine branches Ac connected to the wide branches Ab. The trunks A1 and wide branches A2 are separated from narrow branches Ac to generate registered (verification) data A, B.

On the other hand, in extraction of blood vessel image characteristic quantity data (the first characteristic data), characteristic quantities which are not affected by the circumstances of image capture are extracted. For example, as shown in FIG. 6, the narrow branches Ac and a portion of the thick trunks are excluded from the blood vessel image of FIG. 3, and the distribution of curvature directions in the blood vessel image (called characteristic quantity (1)), the distribution of directions of trunks in the blood vessel image (called characteristic quantity (2)), and a frequency indicating the intervals between trunks and number of trunks in the blood vessel image (called characteristic quantity (3)), are extracted.

The curvature directions of characteristic quantity (1) can be extracted as a characteristic without being affected by the inclination of the hand at the time of image capture. The directions of characteristic quantity (2) can be extracted as a characteristic without being affected by instability of the state of image capture, such as for instance portions missing from the image. And, the frequencies of characteristic quantity (3) can be extracted as a characteristic without being affected by rotation of the blood vessel image.

These broad characteristics of blood vessel images are comparatively common among a plurality of human bodies, and while it is desirable in the interest of accuracy that these three characteristic quantities be used, one or two among them may be used. In particular, it is desirable that the characteristic quantities (1) and (2) be used.

In registration processing 34-6, detected blood vessel image data and the characteristic quantities (1), (2), (3) are registered (stored) in the biometrics information database file 4. As shown in FIG. 2, the biometrics information database file 4 assigns an ID and stores, as a record, the blood vessel image characteristic (vein) data and the characteristic quantities (1), (2) (3). That is, a record is comprised of an ID, the vein characteristic quantities (1), (2) (3), and vein data.

As explained below, the characteristic quantity (1) is curvature components (w1, w2, . . . , w36) in 36 directions; the characteristic quantity (2) is angular components (f1, f2, . . . , f8) in eight directions; and the characteristic quantity (3) is 32 frequency components (h1, h2, . . . , h32).

Registered blood vessel image search processing 34-4 retrieves the blood vessel image characteristic data shown in FIG. 2 and the characteristic quantities (1), (2), (3) from the biometrics information (vein) database file 4. As explained below, the verification processing 34-3 verifies characteristic quantities detected by the blood vessel image detection processing 34-2 against registered characteristic quantities, determines the verification order from the verification degrees of similarity, compares the blood vessel image characteristic data with registered blood vessel image characteristic data in this order of verification, performs verification processing, and outputs the verification result.

Thus in this invention, broad characteristic quantities for blood vessel image data are registered together with characteristic data for use in verification, and at the time of authentication an order of verification is determined using the degrees of similarity of characteristic quantities, and verification of blood vessel image characteristic data is performed in the order of verification thus determined. Hence the order of verification is determined using the captured blood vessel image, so that even when numerous characteristic data sets have been registered, verification can be performed in a verification order based on the blood vessel image for the user, and the speed of verification can be improved.

Biometrics Characteristic Data Registration Processing

Figure 7:
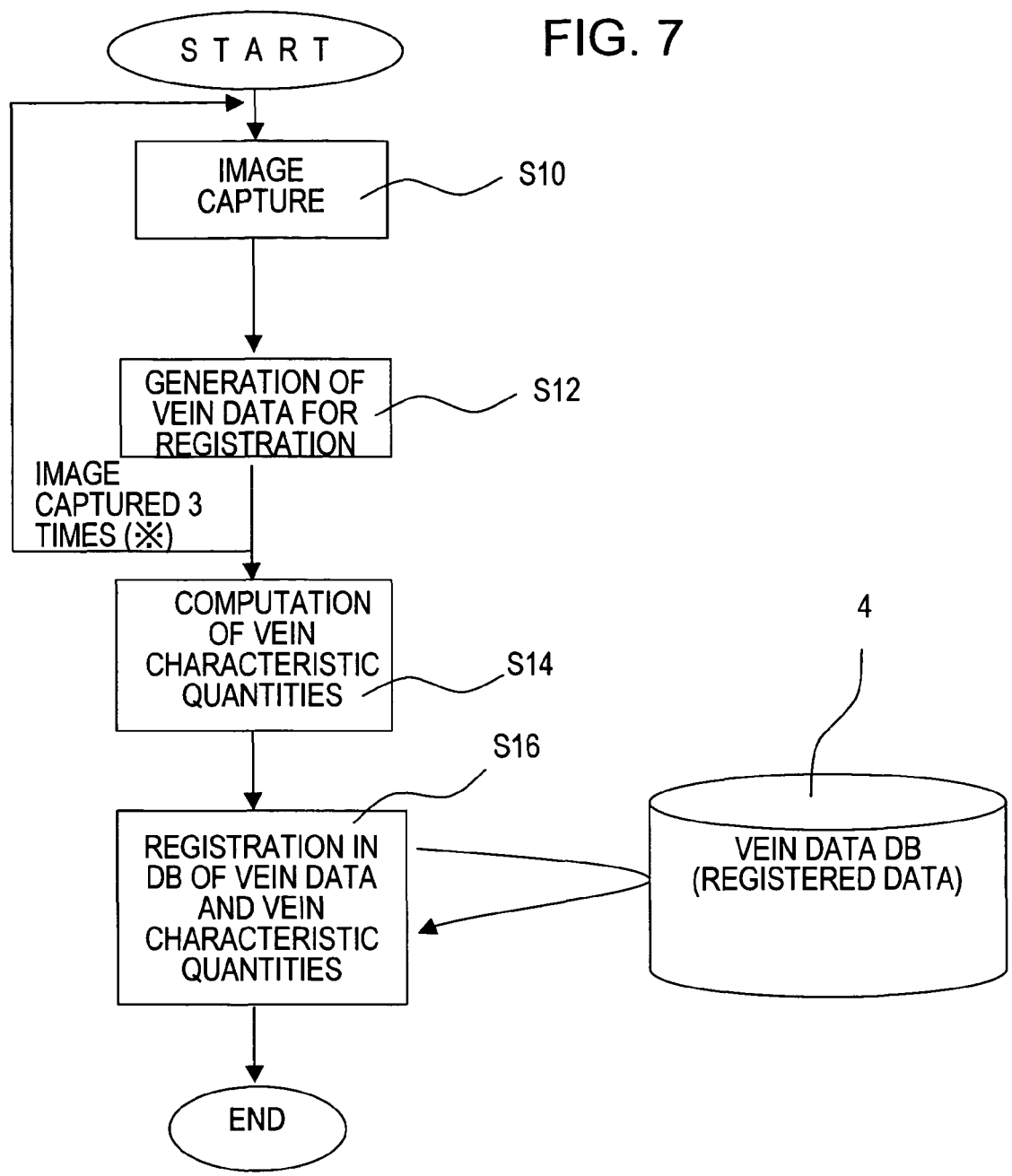
FIG. 7 shows the flow of biometrics information registration processing in one embodiment of the invention.

Next, the biometrics characteristic data registration processing explained using FIG. 1 is further explained using FIG. 7 through FIG. 15. FIG. 7 shows the flow of biometrics characteristic data registration processing in one embodiment of the invention.

(S10) First, the user holds his hand over the image capture device 1, to capture an image of the palm of the hand.

(S12) As explained above, the registered blood vessel image (vein) data such as that of FIG. 5 is generated from the captured image. Here, three images are captured, and three sets of registered data are created for one user.

(S14) Next, the vein characteristic quantities (1), (2), (3) are computed from the blood vessel image (vein) data. This processing is explained below, using FIG. 8 through FIG. 15.

(S16) The data for registration thus generated and the vein characteristic quantities (1), (2), (3) are registered in the vein database 4, as shown in FIG. 2. Then processing ends.

Figure 8:
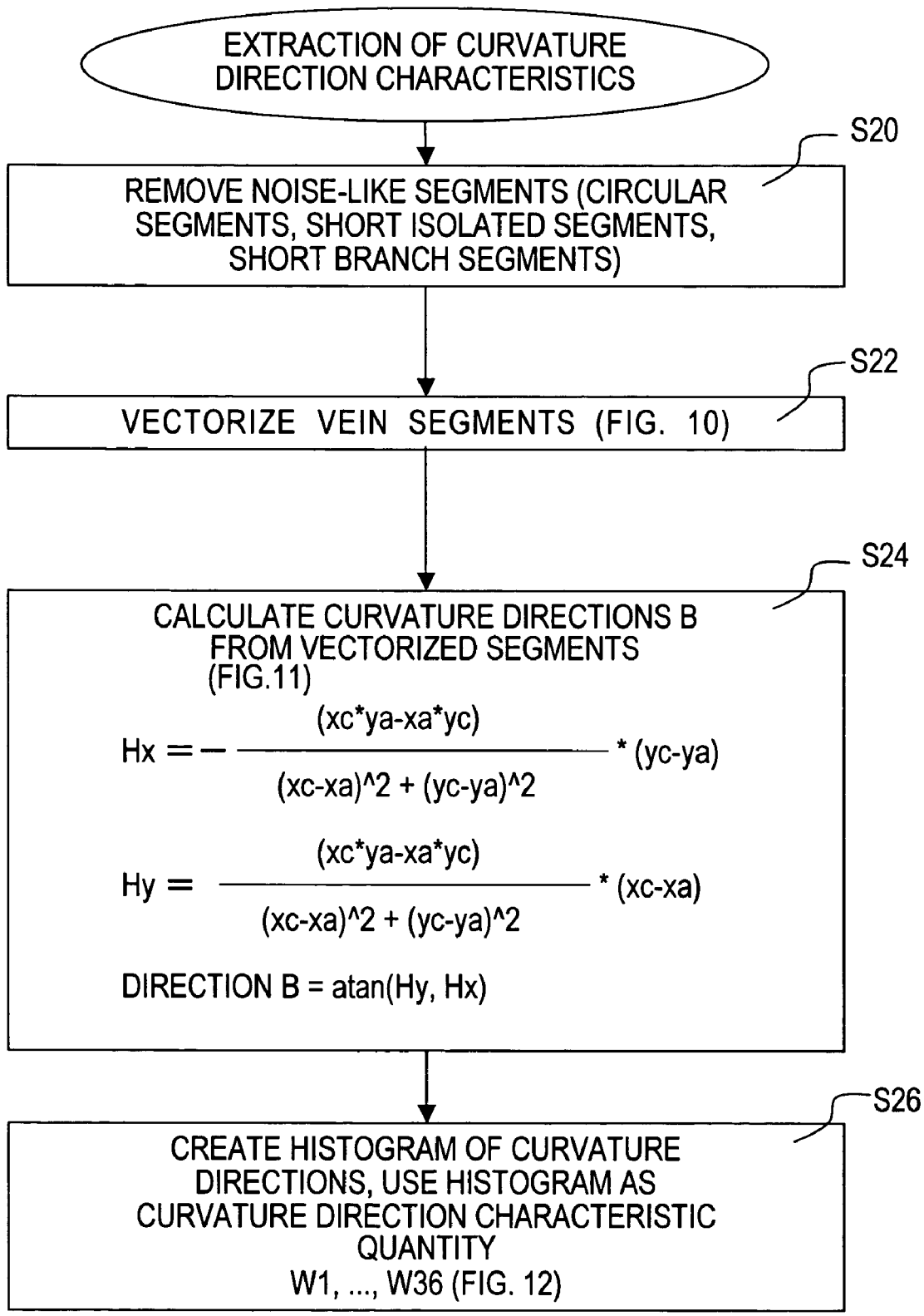
FIG. 8 shows the flow of processing to extract characteristic quantity (1) in FIG. 7.

Next, processing to compute the vein characteristic quantity (1) of FIG. 7 is explained. Here, an example is used in which the blood vessel image (vein) data is converted into linearized vein segments. FIG. 8 shows the flow of processing to extract the characteristic quantity (1) of FIG. 7, FIG. 9 explains the vein segments in FIG. 8, FIG. 10 explains the processing to vectorize vein segments in FIG. 8, FIG. 11 explains processing to compute curvature directions in FIG. 8, and FIG. 12 explains a curvature direction histogram in FIG. 8.

The processing of FIG. 8 is explained referring to FIG. 9 through FIG. 12.

Figure 9:
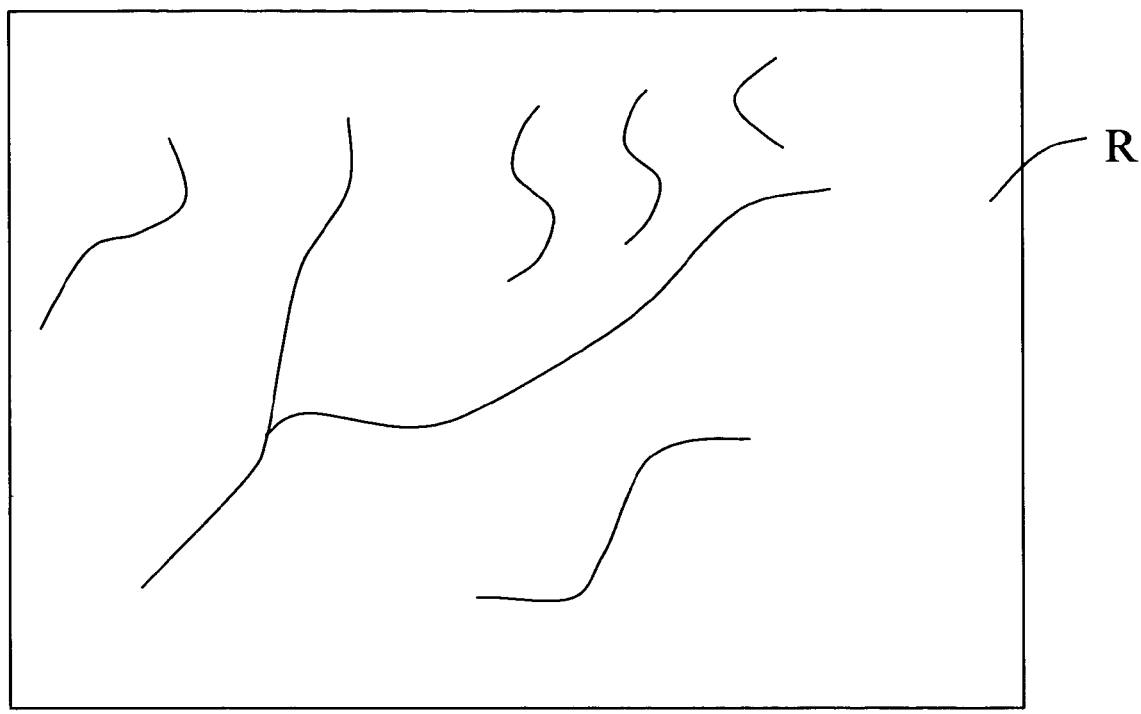
FIG. 9 explains blood vessel image segments in FIG. 8.

(S20) First, noise-like segments are removed. Here, segments forming circles, short isolated segments, and short branch segments are equivalent to noise when viewing overall trends (curvature directions), and so are removed. For example, from the extracted blood vessel image of FIG. 3, the segments forming circles, the short isolated segments, and the short branch segments are removed, as in FIG. 6. In order to remove the circular segments, segments for which the starting point and ending point are the same are extracted and removed. Short isolated segments are for example segments having a segment length of 5 or less. Short branch segments are segments of length 5 or less, one end of which is free (an ending point). FIG. 9 explains a segment model of such segments for removal.

Figure 10:
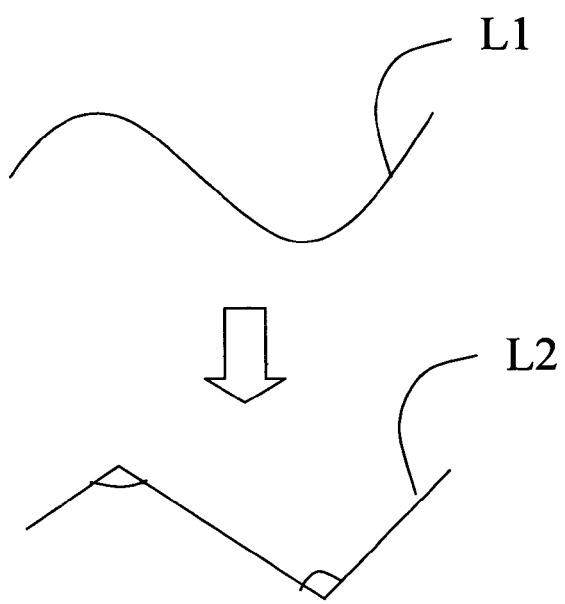
FIG. 10 explains vectorization processing of blood vessel image segments in FIG. 8.
Figure 11:
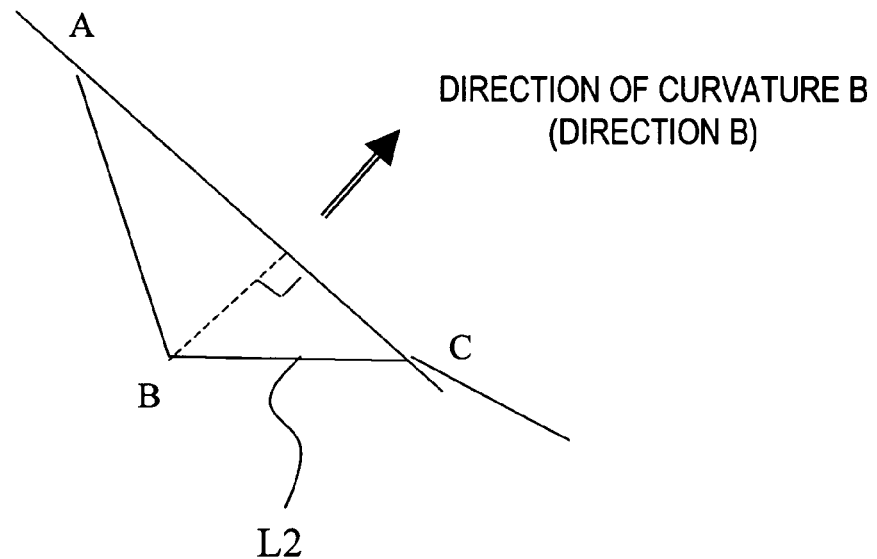
FIG. 11 explains the direction of curvature in FIG. 8.

(S22) Next, segments of interest are approximated by polygonal lines in order to compute curvature directions for segments of interest. As shown in FIG. 10, segments of interest L1 are vectorized to obtain vector segments L2. The curvature angles are then computed using the vector points (points of inflection) and both endpoints.

(S24) Next, curvature directions B are calculated from the vectorized segments. This is explained using the model of FIG. 11. For segments the vectors of which is comprised of three or more points A, B, C, suppose that the coordinates upon performing parallel translation such that point B is at the origin are A'(xa,ya), B'(0,0), C'(xc,yc). Further, suppose that the coordinates of the point of intersection of the straight line AC with the perpendicular line from the point B is H(Hx,Hy). The coordinates Hx, Hy are computed using the following equations (1) and (2).

$$Hx=-(yc-ya)*(xc*ya-xa*yc)/((xc-xa)^2+(yc-ya)^2) \quad (1)$$

$$Hy=(xc-xa)*(xc*ya-xa*yc)/((xc-xa)^2+(yc-ya)^2) \quad (2)$$

The angle of the direction B is calculated using equation (3) below.

$$\text{direction } B=\arctan(Hy/Hx) \quad (3)$$

Figure 12:
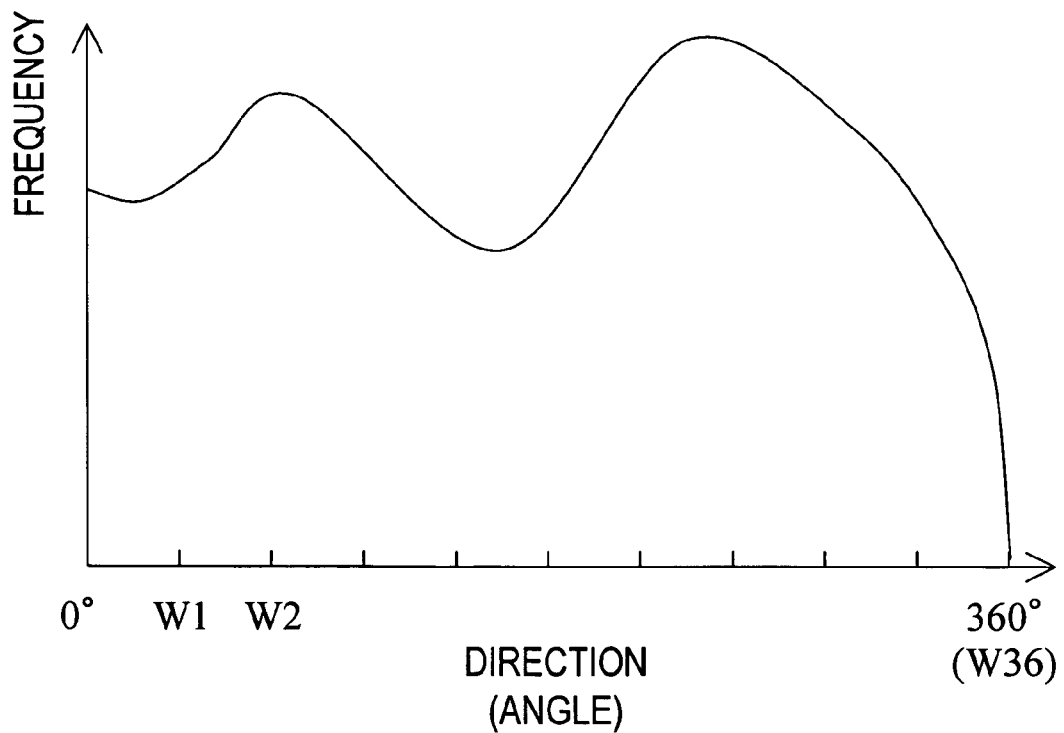
FIG. 12 explains the curvature direction histogram in FIG. 8.

(S26) Next, a histogram of curvature directions B of the vectorized segments is created. FIG. 12 explains histograms of curvature directions. The horizontal axis plots the curvature direction (angle), and the vertical direction indicates the frequency of the corresponding curvature direction, so that a histogram of the frequencies of each curvature direction is created. Here, 36 frequency values w1, w2, . . . , w36 are extracted, in 10° increments of curvature angles, as the curvature direction characteristic quantity (characteristic quantity (1)).

This curvature direction characteristic quantity is a broad representation of curvature directions of each of the segments in the blood vessel image.

Figure 13:
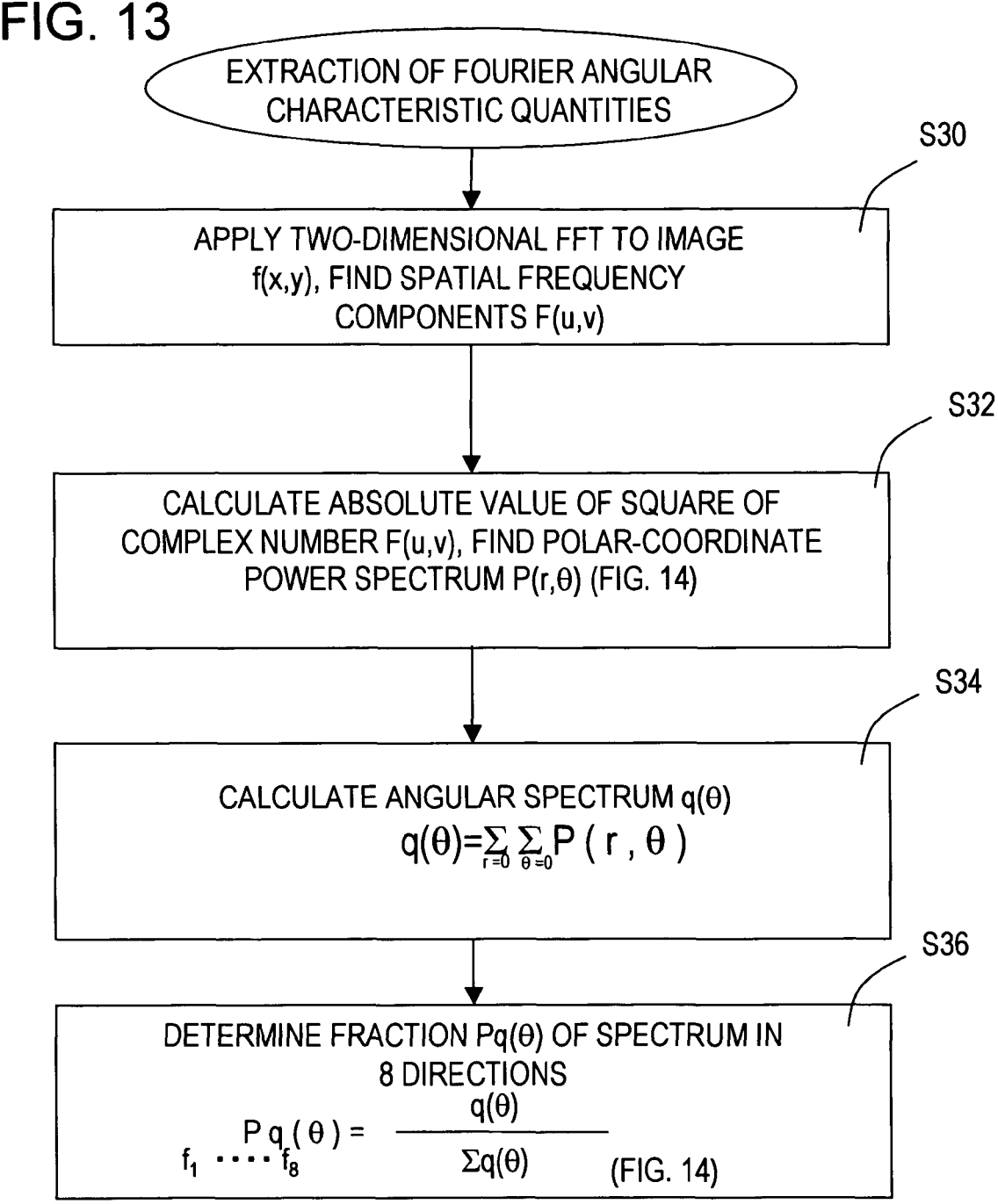
FIG. 13 shows the flow of processing to extract characteristic quantity (2) in FIG. 7.
Figure 14:
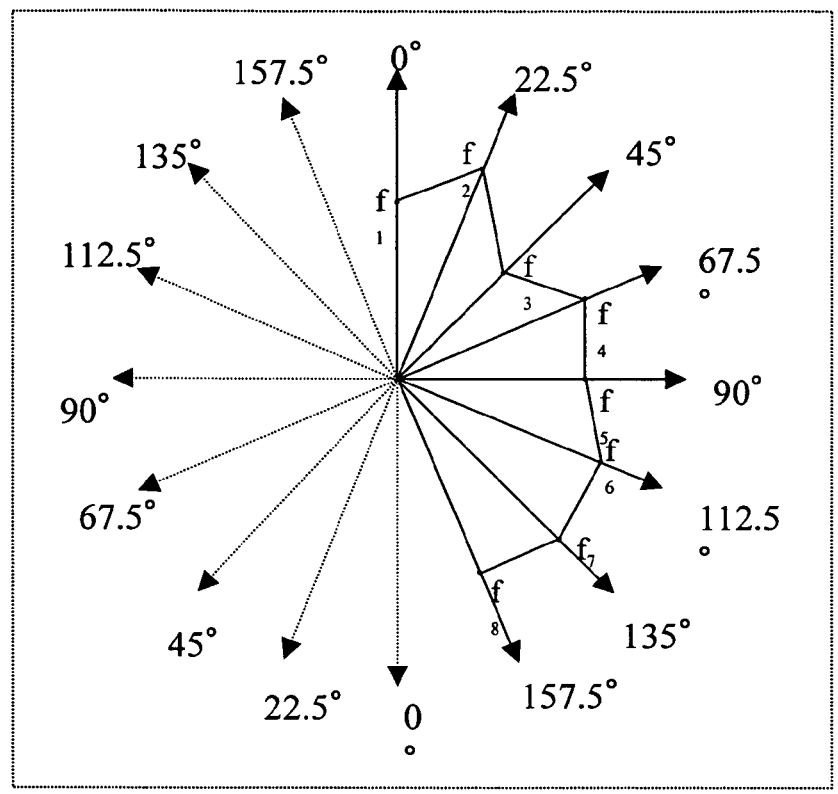
FIG. 14 explains Fourier angles in FIG. 13.
Figure 15:
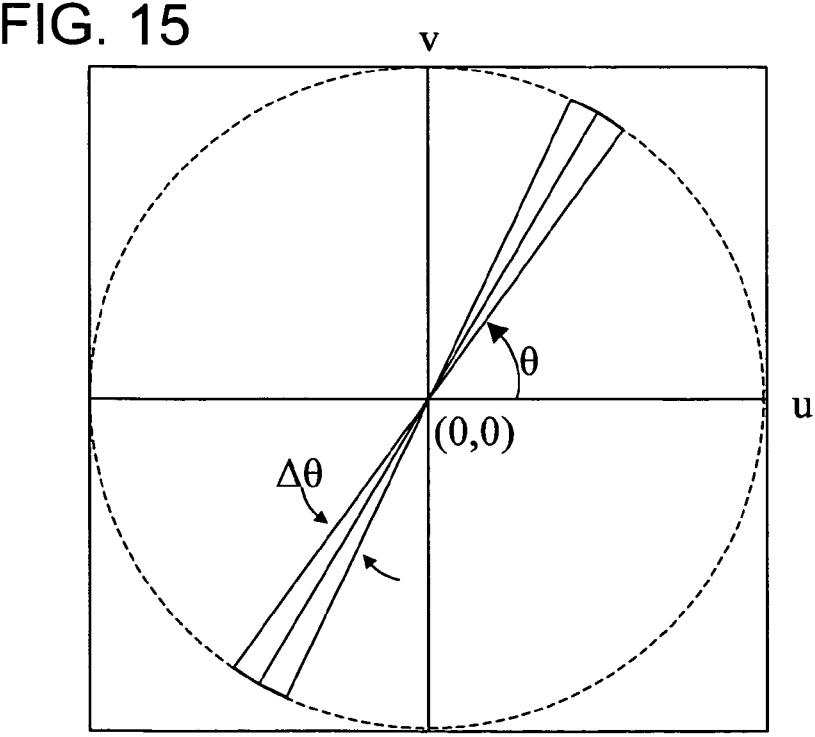
FIG. 15 explains power spectra in FIG. 13.

Next, processing to compute the vein characteristic quantity (2) of FIG. 7 is explained. FIG. 13 shows the flow of processing to extract the characteristic quantity (2) of FIG. 7; FIG. 14 and FIG. 15 explain the Fourier angle characteristic quantity of FIG. 13.

The processing of FIG. 13 is explained referring to FIG. 14 and FIG. 15. First, as shown in FIG. 14, Fourier angles are taken to be in eight directions at intervals of 22.5°, with the upward direction as 0°. The Fourier angle characteristic quantity is calculated as the angle spectrum in these eight directions.

(S30) First, the captured image f(x,y) is subjected to a two-dimensional FFT (Fast Fourier Transform), and the spatial frequency component F(u,v) of the image is computed using equation (4) below. The two-dimensional FFT is obtained by taking the Fourier transform of pixels in each line in the x direction of the image f(x,y), and then performing a y-direction Fourier transform of the FFT result for the line.

$$F(u, v) = (1/MN) * \sum_{x=0}^{M-1} \sum_{y=0}^{N-1} f(x, y) W1^{\wedge}mu * W2^{\wedge}nv \quad (4)$$

Here $W1=\exp(-j2\pi/M)$ and $W2=\exp(-j2\pi/N)$, where M and N are the numbers of pixels in the horizontal and vertical directions respectively.

(S32) Next, the square of the absolute value of the spatial frequency component F(u,v) is calculated, and the following equation (5) is used to compute the power spectrum $P(r, \theta)$. This represents the intensity of the spatial frequency (u,v).

$$P(u,v) = |F(u,v)|^2 \quad (5)$$

As indicated in FIG. 15, when expressed in polar coordinates this is taken to be the power spectrum $P(r, \theta)$.

(S34) From the power spectrum in polar coordinates $P(r, \theta)$, the following equations (6) and (7) are used to calculate the angle spectrum $q(\theta)$.

$$qx(\theta) = \sum_{r=0}^{w/2} P(r, \theta) \quad (6)$$

Here w represents the magnitude of the domain of P(u,r).

$$q(\theta) = \sum_{\theta x = \theta - 5}^{\theta + 5} qx(\theta x) \quad (7)$$

Here θ is one of eight directions, which are θ=0°, 23°, 45°, 68°, 90°, 113°, 135°, 158°, as in FIG. 14. That is, the energy is calculated for angles in eight directions.

(S36) The fractions Pq(θ) of energy q(θ) in the eight directions are computed using the following equation (8).

$$Pq(\theta) = q(\theta)/\Sigma q(\theta) \quad (8)$$

This is used to perform normalization such that the sum of Pq(θ) equals 1.0. In FIG. 14, the energies Pq(θ) in the eight directions are represented by f1, f2, ..., f8. In this way, direction components of the blood vessel image are calculated.

Figure 16:
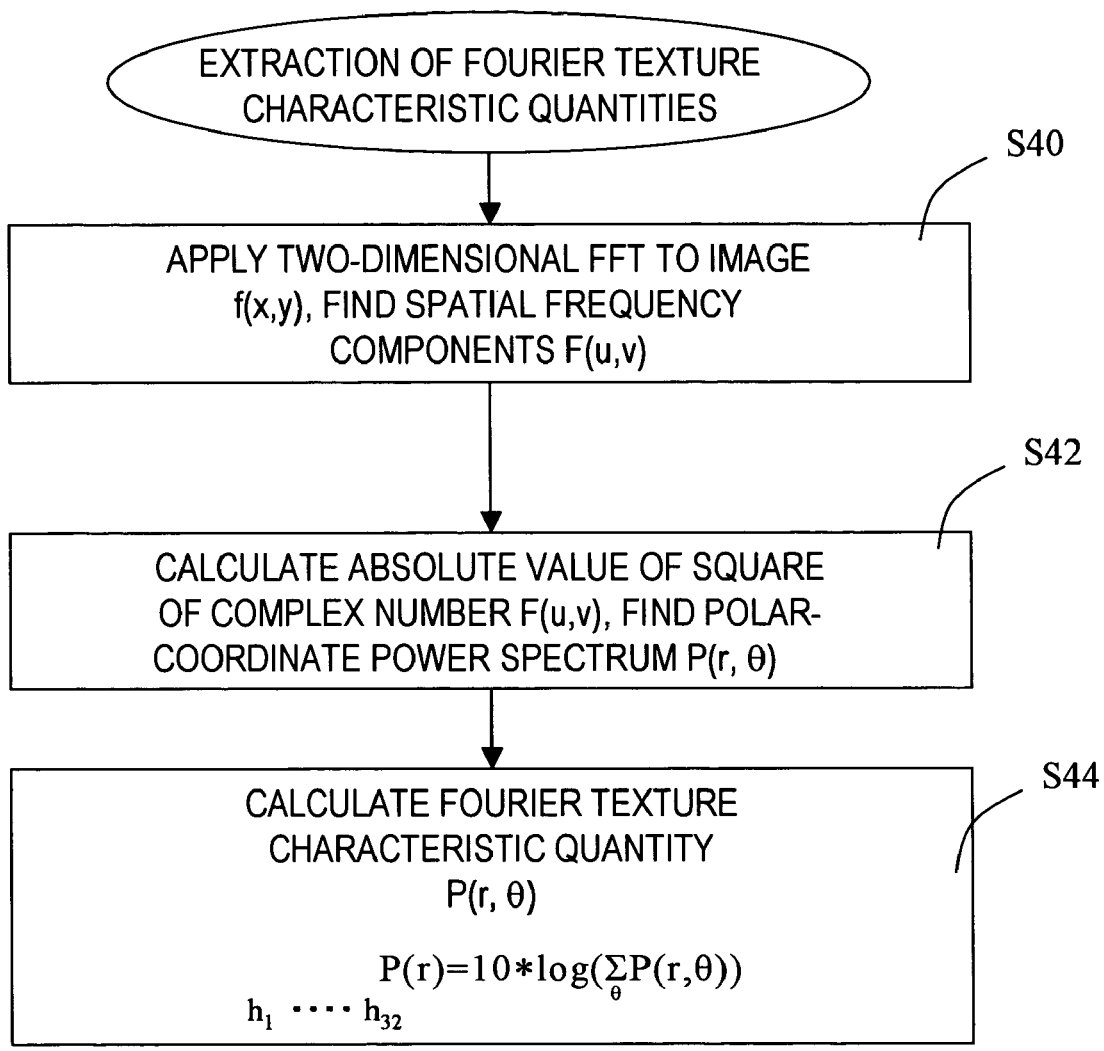
FIG. 16 shows the flow of processing to extract characteristic quantity (3) in FIG. 7.

Next, processing to compute the vein characteristic quantity (3) of FIG. 7 is explained. FIG. 16 shows the flow of processing to extract the characteristic quantity (3) of FIG. 7. The characteristic quantity (3) is a Fourier texture characteristic quantity.

(S40) First, the image f(x,y) of the blood vessel image (veins) is subjected to the two-dimensional FFT (Fast Fourier Transform) using the above-described equation (4), to compute the spatial frequency component F(u,v) of the image. The two-dimensional FFT is obtained by taking the Fourier transform of pixels in each line in the x direction of the image f(x,y), and then performing a y-direction Fourier transform of the FFT result for the line.

(S42) Next, the above-described equation (5) is used to compute the square of the absolute value of the spatial frequency component F(u,v), to determine the power spectrum P(u,v). As shown in FIG. 15, this is represented in polar coordinates and taken to be the power spectrum $P(r, \theta)$.

(S44) From this polar-coordinate power spectrum $P(r, \theta)$, the following equation (9) is used to calculate the Fourier texture characteristic quantity p(r).

$$p(r) = 10 * \log\left(\sum_{\theta=0}^{\pi} P(r, \theta)\right) \quad (9)$$

The Fourier texture characteristic quantity of equation (9) is the sum of the energy of a donut-shape area centered on the origin in the polar coordinate power vector space; here the characteristic quantity (3) is the 32 elements h1, h2, ..., h32 of the intensity distribution. This characteristic quantity (3) indicates the periodicity of the image segments. Because of the extremely broad dynamic range of the intensity distribution, a logarithmic (log) representation is used.

In this way, the direction and periodicity in the blood vessel image are extracted as broad characteristic quantities.

Processing for Biometrics Characteristic Data Verification

Figure 17:
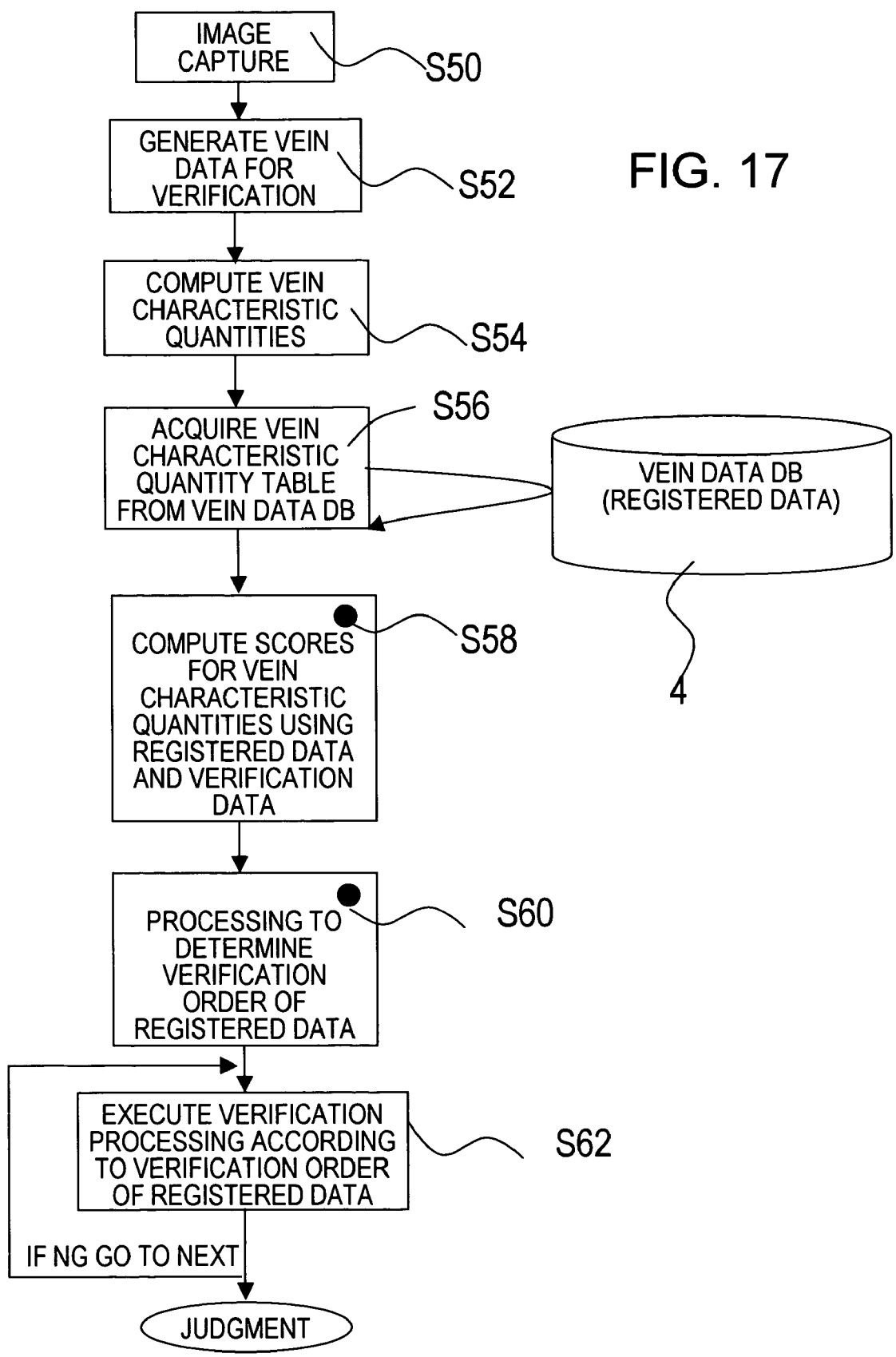
FIG. 17 shows the flow of biometrics characteristic data verification processing in an embodiment of the invention.

Next, the biometrics characteristic data verification processing explained in FIG. 1 is further explained using FIG. 17 through FIG. 20. FIG. 17 shows the flow of the biometrics characteristic data verification processing of FIG. 1, and FIG. 18 explains FIG. 17.

(S50) The user holds his hand over the image capture device 1 to capture an image of the palm.

(S52) As explained above, blood vessel image (vein) data such as that in FIG. 5 is generated from the captured image.

(S54) Next, vein characteristic quantities (1), (2), (3) are computed from the blood vessel image (vein) data. This processing was explained using FIG. 8 through FIG. 16.

(S56) A vein characteristic quantity table (all the records with characteristic quantities (1), (2), (3) in FIG. 2) is retrieved from the vein database 4.

(S58) Scores for characteristic quantities are calculated from the vein characteristic quantities (1), (2), (3) thus generated and the characteristic quantities (1), (2), (3) in the vein characteristic quantity table. As shown in FIG. 18, score 1 is the sum of the differences between the curvature components in 36 directions for the registered data and generated data, and is calculated using the following equation (10).

$$\text{score } 1 = |\text{registered } w1 - \text{verification } w1| + \ldots + |\text{registered } w36 - \text{verification } s36| \qquad (10)$$

Score 2 is the sum of the differences between angle components in eight directions for the registered data and generated data, and is calculated using the following equation (11).

$$\text{score } 2 = |\text{registered } f1 - \text{verification } f1| + \ldots + |\text{registration } f8 - \text{verification } f8| \qquad (11)$$

Score 3 is the sum of the differences between the 32 frequency components for the registered data and generated data, and is calculated using the following equation (12).

$$\text{score } 3 = |\text{registered } h1 - \text{verification } h1| + \ldots + |\text{registered } h32 - \text{verification } h32| \qquad (12)$$

(S60) The verification order determination processing of FIG. 19 is used to determine the verification order from the Scores 1, 2 and 3.

(S62) At this time, verification processing is performed to finally confirm the identity of the individual. Registered characteristic data is retrieved from the vein database 4 according to the verification order determined as described above, and verification against the verification characteristic data generated in step S52 is performed. If the verification result is unsatisfactory, verification is performed against the registered characteristic data set ranked next in the verification order is performed. If the verification result is satisfactory, authentication processing ends.

Figure 20:
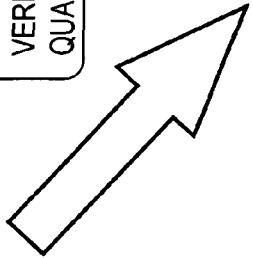

Next, the verification order determination processing of step S60 is explained using FIG. 19 and FIG. 20.

(S70) First, the scores 1[N], 2[N], 3[N] of all the records are sorted, and the order rankings of each of the scores 1, 2, 3 are determined.

(S72) The total score total[N] is calculated for each record (of the registered characteristic data). When α, β and γ are weighting coefficients, then the total score is as given in equation (13).

$$\text{total}[N] = \alpha \cdot \text{score 1 order ranking} + \beta \cdot \text{score 2 order ranking} + \gamma \cdot \text{score 3 order ranking} \qquad (13)$$

(S74) These total scores are sorted, and the verification order is determined from the sorting results. As shown in FIG. 20, when the registered data is stored in record order 1, 2, 3, . . . , N, the verification order becomes the order of the distances from the registered characteristic quantities, and the shorter the distance, the higher is the verification order ranking.

In this way, order rankings for verification with biometrics characteristic data are determined according to the distance from broad characteristic quantities, and verification of registered data against verification data is performed according to the verification order rankings; hence even when numerous biometrics information sets are stored, the speed of verification can be improved, contributing to the widespread adoption and increased scale of biometric authentication systems.

Other Embodiments

In the above embodiments, examples were explained in which biometric authentication is performed by authenticating the vein pattern in the palm of a hand; but the invention can also be applied to biometric authentication of vein patterns on the fingers or the back of the hand, palmprints or other characteristics of the palm of the hand, as well as to fingerprints, facial features, and other biometric authentication. Further, an example of a system to manage ingress to and egress from a facility was explained; but the invention can also be applied to the opening and closing of doors for which individual authentication is required, and other tasks in which authentication is performed in place of the use of a key, or similar.

In the above, embodiments of the invention have been explained; but various modifications to the invention are possible within the scope of the gist of the invention, and these modifications are not excluded from the scope of the invention.

Broad characteristic quantities of biometrics data are registered together with characteristic data for use in verification, and at the time of authentication the order of verification is determined based on the degrees of similarity of characteristic quantities, and verification against biometrics characteristic data is performed in the order of verification thus determined. Consequently, because the order of verification is determined based on biometrics information, verification can be performed in a verification order based on biometrics information for the user, even when numerous characteristic data sets have been registered, so that the speed of verification is improved.

What is claimed is:

1. A biometric authentication apparatus, which detects biometrics characteristic data of a living body and performs individual authentication, comprising:

a detection device which detects the living body and obtains biometrics information;

a control unit which extracts, from said biometrics information, comparatively coarse first biometrics characteristic data and comparatively fine second characteristic data on a user; and a biometrics information database file, in which is stored, as biometrics information on said user, said first biometrics characteristic data and said second biometrics characteristic data, wherein said control unit extracts comparatively coarse first biometrics characteristic data and comparatively fine second characteristic data for use in verification from said biometrics information obtained by said detection device, calculates the degree of similarity between said first biometrics characteristic data for verification and first biometrics characteristic data sets stored in said biometrics database file, determines the order of verification with second biometrics characteristic data sets stored in said biometrics database file according to said degrees of similarity, and performs verification of said second biometrics characteristic data for verification against said stored second biometrics characteristic data sets according to said verification order.

2. The biometric authentication apparatus according to claim 1, wherein said control unit calculates scores indicating a difference between said first biometrics characteristic data for verification and first biometrics characteristic data sets stored in said database file, to obtain said degrees of similarity.

3. The biometric authentication apparatus according to claim 2, wherein said control unit calculates a distance between said first biometrics characteristic data for verification and first biometrics characteristic data stored in said biometrics database file, sorts the distances of said stored data, and determines said verification order.

4. The biometric authentication apparatus according to claim 1, wherein said control unit extracts, as said first biometrics characteristic data, direction components of patterns of said biometrics information.

5. The biometric authentication apparatus according to claim 4, wherein said control unit extracts, as the direction components of said patterns, curvature components of said patterns.

6. The biometric authentication apparatus according to claim 4, wherein said control unit extracts, as the direction components of said patterns, angular components of said patterns.

7. The biometric authentication apparatus according to claim 5, wherein said control unit extracts a plurality of component segments of said patterns, vectorizes said component segments, and extracts said curvature direction components from said vectorized segments.

8. The biometric authentication apparatus according to claim 7, wherein said control unit generates a histogram of curvature directions from curvature components of each segment.

9. The biometric authentication apparatus according to claim 6, wherein said control unit calculates spatial frequency components for said biometrics information, and extracts Fourier angular characteristic quantities from said spatial frequency components as said angular components.

10. The biometric authentication apparatus according to claim 1, wherein said control unit extracts, as said first biometrics characteristic data, direction components and periodicity components of patterns of said biometrics information.

11. The biometric authentication apparatus according to claim 10, wherein said control unit extracts, as the periodicity components of said patterns, frequency components of said patterns.

12. The biometric authentication apparatus according to claim 11, wherein said control unit calculates spatial frequency components for said biometrics information, and extracts Fourier texture characteristic quantities from said spatial frequency components as said frequency components.

13. The biometric authentication apparatus according to claim 1, wherein said detection device comprises a unit for capture of images of blood vessels of said user, and
said first biometrics characteristic data is comparatively coarse characteristic data of said blood vessel images, and said second biometrics characteristic data is comparatively fine characteristic data of said blood vessel images.

14. A biometric authentication method of detecting biometrics characteristic data and performing individual authentication, comprising the steps of:
detecting biometrics information of a living body using a detection device;
extracting, from the biometrics information obtained, comparatively coarse first biometrics characteristic data and comparatively fine second characteristic data on the user;
calculating, using a processing device, the degrees of similarity between said first biometrics characteristic data for verification and the first biometrics characteristic data sets stored in a biometrics database file;
determining the order of verification with second biometrics characteristic data stored in said biometrics database file according to the degrees of similarity; and
verifying said second biometrics characteristic data for verification against said stored second biometrics characteristic data sets according to said verification order.

15. The biometric authentication method according to claim 14, wherein said determination step comprises a step of calculating scores indicating a difference between said first biometrics characteristic data for verification and first biometrics characteristic data sets stored in said biometrics database file, and of obtaining said degrees of similarity.

16. The biometric authentication method according to claim 15, wherein said determination step comprises:
a step of calculating the distance between said first biometrics characteristic data for verification and first biometrics characteristic data stored in said biometrics database file; and
a step of sorting the distances of said stored data and determining said verification order.

17. The biometric authentication method according to claim 14, wherein said extraction step comprises a step of extracting, as said first biometrics characteristic data, direction components of patterns of said biometrics information.

18. The biometric authentication method according to claim 17, wherein said extraction step comprises a step of extracting, as the direction components of said patterns, curvature components of said patterns.

19. The biometric authentication method according to claim 18, wherein said extraction step comprises:
a step of extracting a plurality of component segments of said patterns;
a step of vectorizing said component segments; and
a step of extracting said curvature direction components from said vectorized segments.

20. The biometric authentication method according to claim 19, wherein said extraction step comprises a step of generating a histogram of curvature directions from curvature components of each segment.

21. The biometric authentication method according to claim 17, wherein said extraction step comprises a step of extracting, as the direction components of said patterns, angular components of said patterns.

22. The biometric authentication method according to claim 21, wherein said extraction step comprises:
a step of calculating spatial frequency components for said biometrics information; and
a step of extracting Fourier angular characteristic quantities from said spatial frequency components as said angular components.

23. The biometric authentication method according to claim 14, wherein said extraction step comprises a step of extracting, as said first biometrics characteristic data, direction components and periodicity components of patterns of said biometrics information.

24. The biometric authentication method according to claim 23, wherein said extraction step comprises a step of extracting, as the periodicity components of said patterns, frequency components of said patterns.

25. The biometric authentication method according to claim 24, wherein said extraction step comprises:
a step of calculating spatial frequency components for said biometrics information; and
a step of extracting Fourier texture characteristic quantities from said spatial frequency components as said frequency components.

26. The biometric authentication method according to claim 14, wherein said extraction step comprises a step of extracting, from the blood vessel image of said detection device comprising a unit for capture of blood vessel images of said user, said first biometrics characteristic data which is comparatively coarse characteristic data of said blood vessel images, and said second biometrics characteristic data which is comparatively fine characteristic data of said blood vessel images.

* * * * *